United States Patent [19]

Watt

[11] 4,041,490
[45] Aug. 9, 1977

[54] MEASUREMENT SYSTEM CALIBRATED TO BE INSENSITIVE TO TEMPERATURE VARIATION INDUCED CHANGES IN INTERNAL PHASE SHIFTS PRESENT IN THE SYSTEM

[75] Inventor: Richard Edwin Watt, San Diego, Calif.

[73] Assignee: Cubic Corporation, San Diego, Calif.

[21] Appl. No.: 699,898

[22] Filed: June 25, 1976

[51] Int. Cl.² .............................................. G01S 7/40
[52] U.S. Cl. .................................................. 343/17.7
[58] Field of Search ....................................... 343/17.7

[56] References Cited

U.S. PATENT DOCUMENTS

| | | | |
|---|---|---|---|
| 3,295,130 | 12/1966 | Prestwood | 343/17.7 |
| 3,302,199 | 1/1967 | Kelly et al. | 343/17.7 X |
| 3,427,615 | 2/1969 | Hubka | 343/17.7 X |
| 3,471,855 | 10/1969 | Thompson | 343/17.7 |
| 3,766,555 | 10/1973 | Watt | 343/14 |
| 3,845,484 | 10/1974 | Sawicki et al. | 343/17.7 X |
| 3,883,870 | 5/1975 | Kunz | 343/17.7 |
| 3,973,259 | 8/1976 | Hellgren et al. | 343/17.7 X |

*Primary Examiner*—Malcolm F. Hubler
*Attorney, Agent, or Firm*—Brown & Martin

[57] ABSTRACT

A measurement system wherein a given quantity such as distance, is determined by measuring the phase shift between a transmitted signal and a signal received from a transponder in response to the transmitted signal. The system includes a transmitter, a receiver, a digital phasemeter for measuring the phase shift and for providing a count representative thereof, and a calibration system for making the measurement system insensitive to temperature variation induced changes in internal phase shifts present in the transmitter and receiver.

5 Claims, 3 Drawing Figures

MEASUREMENT SYSTEM CALIBRATED TO BE INSENSITIVE TO TEMPERATURE VARIATION INDUCED CHANGES IN INTERNAL PHASE SHIFTS PRESENT IN THE SYSTEM

BACKGROUND OF THE INVENTION

The present invention pertains to measurement systems wherein a given quantity is determined by measuring the phase shift between a transmitted signal and a signal received from a transponder in response to the transmitted signal, and is particularly directed to an improvement in the calibration of such systems.

Such systems are employed in the measurement of such quantities as distance (range) or angle. In this type of distance measuring system, a continuous wave signal is used to frequency modulate a carrier signal which is transmitted to a transponder device in a vehicle or an object as to which the distance is to be determined. The distance measuring apparatus receives the original continuous wave signal from the transponder on a different carrier frequency and measures the phase shift between the transmitted continuous wave signal and the continuous wave signal received from the transponder in response to the transmitted signal. The measured phase shift is proportional to the distance to the transponder from the transmitter and the receiver of the measurement system. Typically such distance measurement systems use at least two continuous wave signals having related modulation frequencies in order to produce resolution of range and maximum ranging capabilities; and the phase shift is measured with a digital phasemeter which provides a count representative thereof.

In that distance is being determined by measuring the phase shifts in the transmitted signals, it is therefore necessary that internal phase shifts present in the measurement system, and changes in the internal phase shifts induced by variations in temperature, must be accounted for. A system of calibration is therefore required to keep the internal phase shifts and the temperature variation induced changes therein from adding to or subtracting from the phase shift being measured that is induced by the distance to be determined. Because of temperature variation induced changes in the internal system phase shifts, initial system calibration, to compensate for the internal system phase shifts, provides only partial compensation.

Through careful system design, it is possible to keep the temperature variation induced changes in phase shift to a minimum. However, over a period of time (15 minutes to 1 hour) it is common to see a change of 5 bits or more in the count provided by the phasemeter, due to temperature variations. Usually, a distance measuring system is calibrated to compensate for the major phase shifts inherent in the system by means of switches which preset the count in the phasemeter. The output range of the system can then be made to read 0 or any other desired range value. This initial preset count will not, however, remain because of the previously discussed temperature variation induced changes in the internal phase shifts present in the system.

Although, the system components, such as the transmitter and receiver can be stringently designed to have a very low temperature coefficient with respect to phase shift, such a design significantly increases the cost and size of such components.

SUMMARY OF THE INVENTION

The measurement system of the present invention is characterized by a calibration system for making the measurement system insensitive to temperature variation induced changes in internal phase shifts present in the transmitter and the receiver. The calibration system includes a switching device for placing the measurement system in a calibration mode wherein a closed path is completed from the transmitter through the switching means to the receiver, and for placing the measurement system in a measurement mode wherein the path from the transmitter to the receiver is via the transponder. The calibration system further includes a control device for causing the phasemeter to count down when the measurement system is in the calibration mode, and for causing the phasemeter to count up when the measurement system is in the measurement mode. The down-count is a number representative of the combined internal phase shifts present in the transmitter, the receiver and the switching means; and the up-count is a number representative of the measured phase shift induced by the given quantity to be determined such as distance, plus the combined internal phase shifts of the transmitter, the receiver and the transponder.

In using this calibration system, first the phasemeter is preset to contain an initial count equal to a number representative of the internal phase shift of the switching means minus a number representative of the internal phase shift of the transponder, and then operated in the calibration mode and the measurement mode. The counts representative of the internal phase shifts are mutually offset, with the remaining count in the phasemeter being representative of the phase shift induced by the given quantity to be determined.

The system and method of the present invention thus eliminates the necessity for frequent manual calibration of the measurement system. The present invention also relieves the transmitter and receiver of the stringent design requirements that would be necessary to provide them with a very low temperature coefficient and thereby minimize temperature variation induced changes in their internal phase shifts.

DESCRIPTION OF THE PREFERRED EMBODIMENTS

Figure 1:
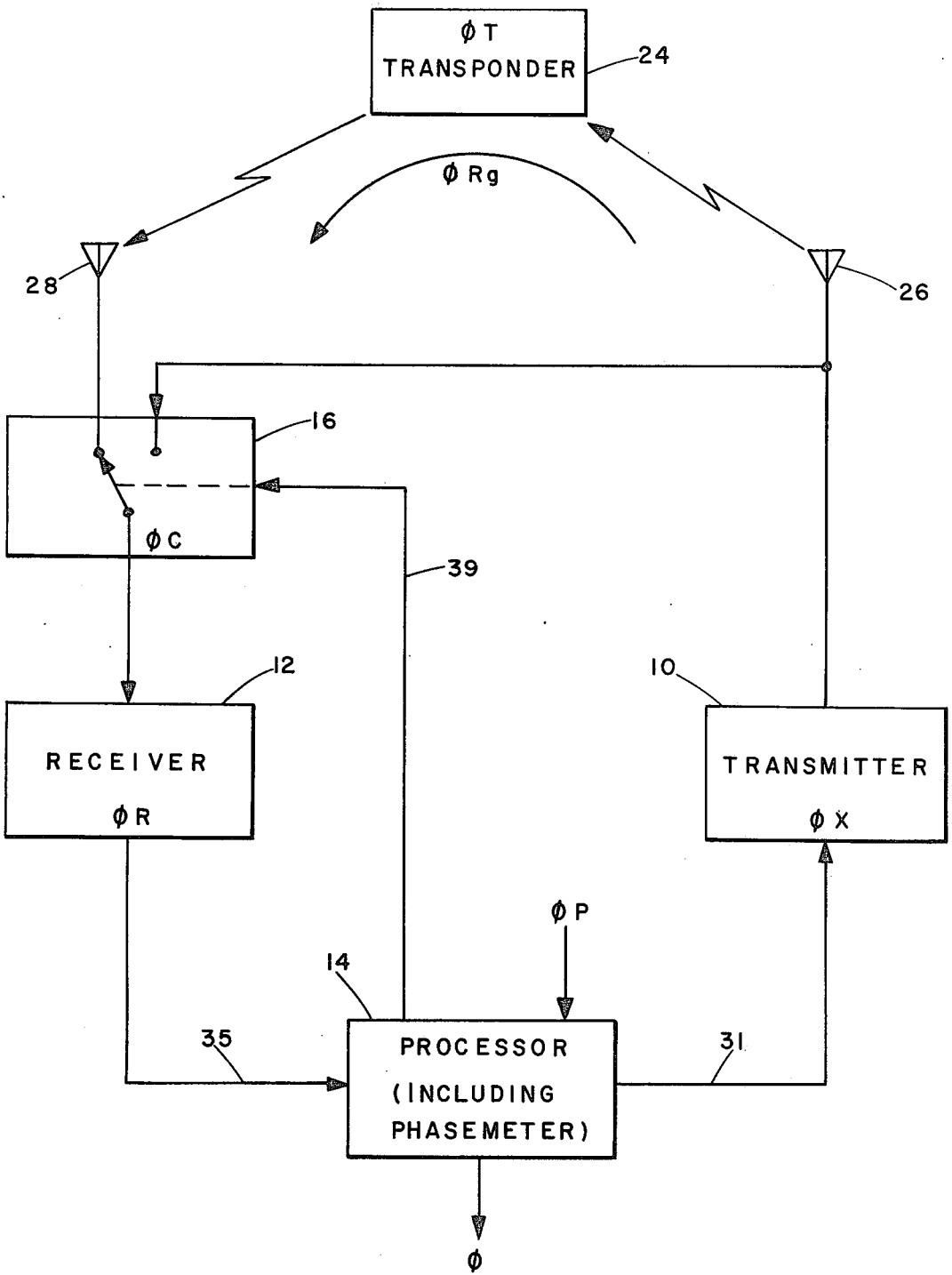
FIG. 1 is a schematic block diagram of a distance measurement system according to the present invention.
Figure 2:
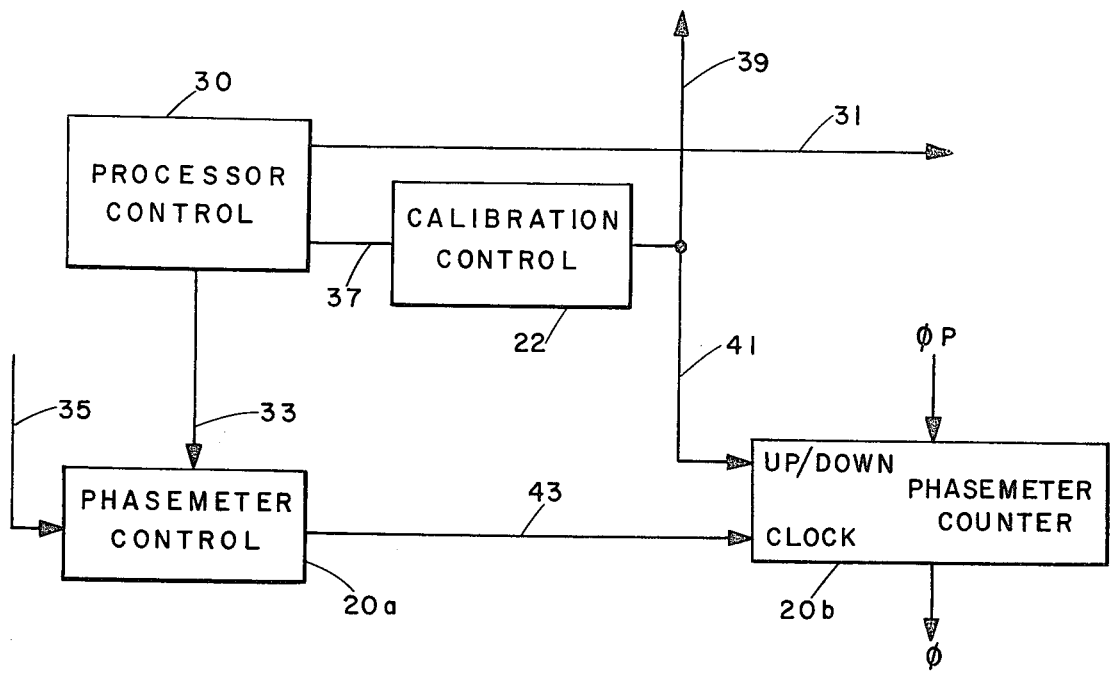
FIG. 2 is a schematic block diagram of one preferred embodiment of the processor portion of the measurement system shown in FIG. 1.

Referring to FIG. 1, the measurement system includes a transmitter 10, a receiver 12, a processor 14, and a calibration switch 16. The calibration switch 16 is an RF diode switch. The processor 14 includes a phasemeter 20a, 20b and a calibration control device 22, as shown in FIG. 2.

The internal phase shifts of the transmitter 10, the receiver 12 and the calibration switch 16 are shown in FIG. 1 as $\phi X$, $\phi R$ and $\phi C$ respectively. Similarly identified are the internal phase shift $\phi T$ of a transponder 24 and the phase shift $\phi Rg$ induced by the distance to be measured from the transmitter 10 and the receiver 12 to the transponder 24. The $\phi P$ input to the processor 14 represents the initial count that is preset into the phasemeter. The $\phi$ output from the processor 14 represents the count provided by the phasemeter.

The processor 14 generates a continuous wave signal which is transmitted on a carrier signal by the transmitter 10, from an antenna 26 to a transponder 24. The transponder 24 returns this signal on a different carrier frequency to an antenna 28, and during the measurement mode the returned signal is received by the receiver 12 via the calibration switch 16 (the switch 16 being in the position shown in FIG. 1). During the calibration mode the calibration switch 16 is controlled by the control device 22 in the processor 14 to be in the alternative position such that the carrier signal from the transmitter 10 is passed directly through the calibration switch 16 to the receiver 12 and the signal from the transponder 24 is not received by the receiver 12.

Each measurement cycle consists of first presetting the phasemeter 20 to contain an initial count $\phi P$ and then taking readings in the calibration mode and the measurement mode. The initial count, $$\phi P = \phi T - \phi C$$

represents the difference between the internal phase shifts of the transponder 24 and the calibration switch 16. The transponder has a very low temperature coefficient with respect to its internal phase shift $\phi T$, and the internal phase shift $\phi C$ of the switch 16 changes very little with respect to temperature variations in comparison to the magnitude of the temperature variation induced changes in the internal phase shifts of the transmitter 10 and the receiver 12.

The initial count $\phi P$ is preset into the phasemeter by operating the measurement system in the measurement and calibration modes to receive measurement data from a transponder at a known distance, and by adjusting the presetting switches for the phasemeter until the phasemeter provides a count representative of the known distance. Once the initial phasemeter count is correctly preset it does not have to be preset again for each measurement cycle, although it should be checked periodically. It usually does not have to be reset for several weeks depending upon the characteristics of the transponder and the calibration switch.

During the calibration mode the calibration control device 22 causes the phasemeter 20 to count down the following number:

$$\phi X + \phi C + \phi R,$$

representing the combined internal phase shifts of the transmitter 10, the calibration switch 16 and the receiver 12.

During the measurement mode the control device 22 causes the phase-meter to count up the following number:

$$\phi X + \phi T + \phi Rg + \phi R$$

The total count in the phasemeter $\phi$ then becomes:

$$\frac{\phi P}{\text{Preset}} - \frac{[\phi X + \phi C + \phi R]}{\text{Calibrate (count-down)}} + \frac{[\phi X + \phi T + \phi Rg + \phi R]}{\text{Measure (up-count)}}$$

Simplifying this expression, the following results:

$$\phi = \phi P - \phi X - \phi C - \phi R + \phi X + \phi T + \phi Rg + \phi R;$$

and, after cancelling out like terms:

$$\phi = \phi P - \phi C + \phi T + \phi Rg.$$

With the initial $\phi P$ count being preset to equal the quantity $\phi C - \phi T$, then $\phi P - (\phi C - \phi T) = 0$ and the value remaining in the phasemeter at the end of the total measurement cycle is the value $\phi Rg$.

The arithmetic operations for performing the addition and subtraction of terms during the measurement process takes place in the phasemeter controls section 20a. These arithmetic operations are fully described in U.S. Pat. No. 3,766,555 for Computing Digital Averaging Phase Meter, to Richard E. Watt.

The processor 14 is shown in greater detail in FIG. 2. The processor control circuit 30 generates the continuous wave modulation frequency signal and provides this signal to the transmitter 10 on line 31. The processor controls circuit 30 also provides a reference signal on line 33 to a phasemeter control circuit 20a. The phasemeter control circuit 20a receives and conditions the reference signal on line 33 and the signal from the receiver 12 on line 35, so that the phasemeter counter 20b counts-up a number representative of the phase shift between the reference signal on line 33 and the signal from the receiver 12 on line 35.

The processor control circuit 30 further provides signals on line 37 which cause the calibration control device 22 to provide a calibration control signal on line 39 to the calibration switch 16 and on line 41 to the phasemeter counter 20b. The calibration control signal is a digital signal. When the calibration control signal is "high" (logic 1), the signal on line 39 switches the calibration switch 16 to connect the transmitter 10 output directly to the receiver 12 input and thus places the measurement system in the calibration mode. A high calibration control signal on line 41 causes the phasemeter counter 20b to count down. When the calibration control signal is "low" (logic 0), the signal on line 39 switches the calibration switch 16 to connect the receiver 12 to the antenna 28 and thus place the measurement system in the measurement mode. A low calibration control signal on line 41 causes the phasemeter counter to count up.

The digital phasemeter 20a, 20b is an averaging type digital phasemeter, wherein a plurality of measurements of phase shift can be made by the phasemeter control circuit 20a, with only the average of the plurality of measurements in each mode being transmitted on line 43 to the phasemeter counter 20b for providing the count therein 20b.

More than one continuous wave modulation frequency signal is used in a typical distance measurement system. A separate phasemeter is used to measure the phase shift that is induced in each such signal by the distance measurement.

Figure 3:
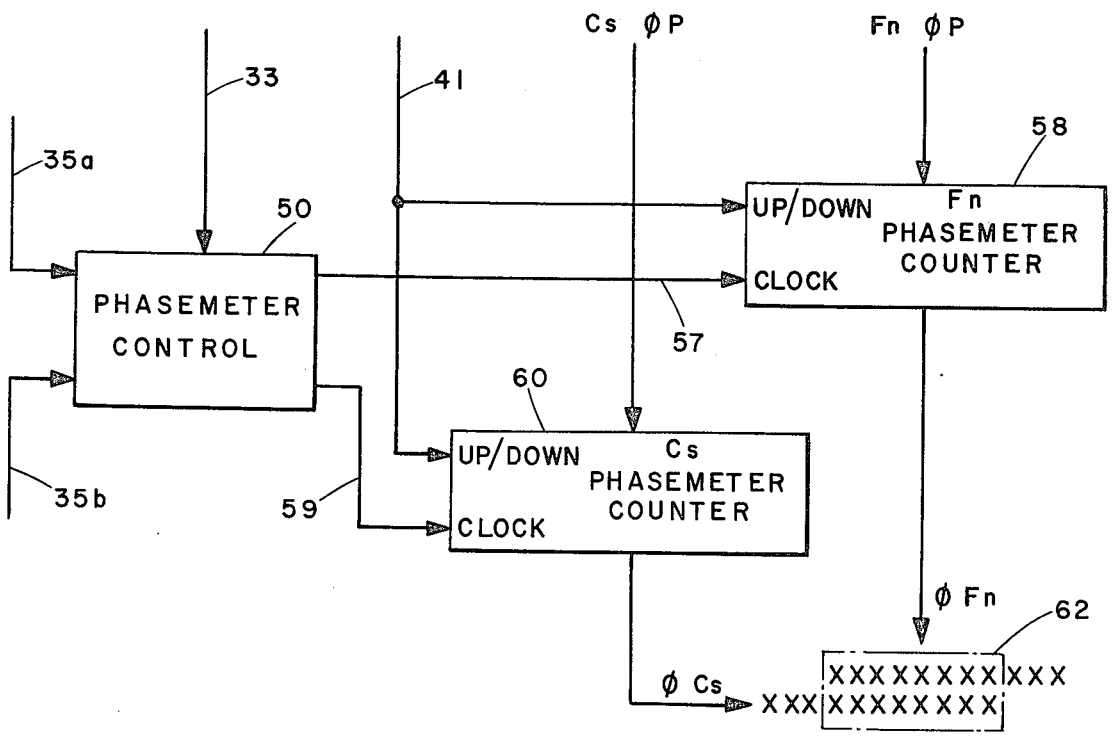
FIG. 3 is a schematic block diagram of an alternative preferred embodiment of the phasemeter portion of the processor portion shown in FIG. 2.

FIG. 3 illustrates the phasemeter portion of a distance measurement system wherein two continuous wave signals having modulation frequencies related by a factor of 8 are transmitted on a carrier signal to obtain "fine" measurement data and "coarse" measurement data. The phasemeter control circuit 50 receives a coarse data measurement signal on line 35a from the receiver 12, a fine data measurement signal on line 35b from the receiver 12, and a reference signal on line 33 from the processor control circuit 30.

The value of the phase shift measurement between the fine data measurement signal and the reference signal is provided on line 57 to a "fine data" phasemeter counter 58; and the value of the phase shift measurement between the coarse data measurement signal and the reference signal is provided on line 59 to a "coarse data" phasemeter 60.

The calibration control signal on line 41 is applied to both phasemeter counters 58 and 60.

The two phasemeters 58 and 60 provide their counts in the form of 11 bit data words, $\phi Fn$ and $\phi Cs$ respectively, which overlap in eight bit positions 62, as shown in FIG. 3. It is necessary that each phasemeter counter 58, 60 be calibrated separately to account for the different internal phase shifts of the transponder $\phi T$ and the calibration switch $\phi C$ that are induced at the different modulation frequencies. This must be done to properly align the overlapping bit positions in the data words $\phi Fn$ and $\phi Cs$.

Calibration for this system consists of first presetting the initial count $Fn$ $\phi P$ in the phasemeter counter 58 to produce a correct distance reading corresponding to a known transponder distance. Next, the initial count $Cs$ $\phi P$ in the phasemeter 60 is preset to cause the coarse ($\phi Cs$) overlapping bits to be numerically equivalent to the corresponding fine ($\phi Fn$) overlapping bits. The three most-significant bits of the count in the "coarse data" word $\phi Cs$ are then set so that the phasemeter 60 provides a count representing the correct transponder distance in the composite data word, i.e., the $\phi Fn$ data bits plus the three most significant bits of the $\phi Cs$ data bits.

For this example of a two-channel distance measurement system, the expression for the total phase measurement is as follows:

$$[Fn\ \phi P + Cs\ \phi P] - [\phi X + \phi C + \phi R]\ Fn - [\phi X + \phi C + \phi R]\ Cs + [\phi X + \phi T + \phi Rg + \phi R]\ Fn + [\phi X + \phi T + \phi Rg + \phi R]\ Cs$$

With each $\phi P$ value initially set to equal the corresponding $-\phi C + \phi T$ values, then the remaining counts in the phasemeter counters 58 and 60 will equal $\phi Rg\ Fn$ and $\phi Rg\ Cs$ respectively. The two counts are then aligned as shown in FIG. 3 to form a composite data word representing the distance to be determined.

Having described my invention, I now claim:

1. A measurement system wherein a given quantity is determined by measuring the phase shift between a transmitted continuous wave signal from a transmitter and a continuous wave signal received by a receiver from a transponder in response to said transmitted signal, comprising
   said transmitter,
   said receiver, and
   a digital phasemeter for measuring said phase shift and for providing a count representative thereof, and including means for presetting the count therein to compensate for internal phase shifts in the measurement system,
   wherein the improvement comprises
   a calibration system connected to the transmitter and the receiver for making the measurement system insensitive to temperature variation induced changes in internal phase shifts present in the transmitter and the receiver.

2. A measurement system wherein a given quantity is determined by measuring the phase shift between a transmitted signal from a transmitter and a signal received by a receiver from a transponder in response to said transmitted signal, comprising
   said transmitter,
   said receiver, and
   a digital phasemeter for measuring said phase shift and for providing a count representative thereof, and including means for presetting the count therein to compensate for internal phase shifts in the measurement system,
   wherein the improvement comprises
   a calibration system for making the measurement system insensitive to temperature variation induced changes in internal phase shifts present in the transmitter and the receiver, wherein the calibration system comprises
   switching means for placing the measurement system in a calibration mode wherein a closed path is completed from the transmitter through the switching means to the receiver, and for placing the measurement system in a measurement mode wherein the path from the transmitter to the receiver is via the transponder; and control means for causing the phasemeter to count down when the measurement system is in said calibration mode, said down-count being a number representative of the combined internal phase shifts present in the transmitter, the receiver and the switching means, and for causing the phasemeter to count up when the measurement system is in the measurement mode, said up-count being a number representative of the measured phase shift induced by the given quantity to be determined plus the combined internal phase shifts of the transmitter, the receiver and the transponder; whereby when the phasemeter has been preset to contain a count equal to a number representative of the internal phase shift of the switching means minus a number representative of the internal phase shift of the transponder, and then operated in said calibration mode and said measurement mode, said counts representative of said internal phase shifts are mutually offset, with the remaining count being representative of the phase shift induced by the given quantity to be determined.

3. A distance measurement system wherein a distance is determined by measuring the phase shift between a transmitted continuous wave signal from a transmitter and a continuous wave signal received by a receiver from a transponder in response to said transmitted signal, comprising
   said transmitter,
   said receiver, and
   a digital phasemeter for measuring said phase shift and for providing a count representative thereof, and including means for presetting the count therein to compensate for internal phase shifts in the measurement system,
   wherein the improvement comprises
   a calibration system connected to the transmitter and the receiver for making the measurement system insensitive to temperature variation induced changes in internal phase shifts present in the transmitter and the receiver.

4. A distance measurement system wherein a distance is determined by measuring the phase shift between a transmitted signal from a transmitter and a signal received by a receiver from a transponder in response to said transmitted signal, comprising said transmitter, said receiver, and a digital phasemeter for measuring said phase shift and for providing a count representative thereof, and including means for presetting the count therein to compensate for internal phase shifts in the measurement system, wherein the improvement comprises a calibration system for making the measurement system insensitive to temperature variation induced changes in internal phase shifts present in the transmitter and the receiver, wherein the calibration system comprises switching means for placing the measurement system in a calibration mode wherein a closed path is completed from the transmitter through the switching means to the receiver, and for placing the measurement system in a measurement mode wherein the path from the transmitter to the receiver is via the transponder; and control means for causing the phasemeter to count down when the measurement system is in said calibration mode, said down-count being a number representative of the combined internal phase shifts present in the transmitter, the receiver and the switching means, and for causing the phasemeter to count up when the measurement system is in the measurement mode, said up-count being a number representative of the measured phase shift induced by the distance to be determined plus the combined internal phase shifts of the transmitter, the receiver and the transponder;

whereby when the phasemeter has been preset to contain a count equal to a number representative of the internal phase shift of the switching means minus a number representative of the internal phase shift of the transponder, and then operated in said calibration mode and said measurement mode, said counts representative of said internal phase shifts are mutually offset, with the remaining count being representative of the phase shift induced by the distance to be determined.

5. A method of calibrating a measurement system wherein a given quantity is determined by using a digital phasemeter for measuring the phase shift between a transmitted signal from a transmitter and a signal received by a receiver from a transponder in response to said transmitted signal, and for providing a count representative of said measured phase shift, said method comprising presetting the count in the phasemeter to compensate for internal phase shifts in the measurement system, wherein the improvement comprises placing the measurement system in a calibration mode wherein a closed path is completed from the transmitter through a switching means to the receiver, and causing the phasemeter to count down a number representative of the combined internal phase shifts present in the transmitter, the receiver and the switching means; and placing the measurement system in a measurement mode wherein the path from the transmitter to the receiver is via the transponder, and causing the phasemeter to count up a number representative of the measured phase shift induced by the given quantity to be determined plus the combined internal phase shifts of the transmitter, the receiver and the transponder; and presetting the phasemeter to contain an initial count equal to a number representative of the internal phase shift of the switching means minus a number representative of the internal phase shift of the transponder;

whereby when the phasemeter has been preset to contain said initial count, and then operated in said calibration mode and said measurement mode, said counts representative of said internal phase shifts are mutually offset, with the remaining count being representative of the phase shift induced by the given quantity to be determined.

* * * * *